United States Patent
Nguyen et al.

(10) Patent No.: US 6,338,374 B1
(45) Date of Patent: Jan. 15, 2002

(54) RUNFLAT TIRE WITH FABRIC UNDERLAY AND TREAD INSERT

(75) Inventors: Gia Van Nguyen, Rossignal; Roland Close, Burg-Reuland, both of (BE); Samuel Patrick Landers, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/554,554

(22) PCT Filed: Mar. 26, 1998

(86) PCT No.: PCT/US98/06004
§ 371 Date: May 15, 2000
§ 102(e) Date: May 15, 2000

(87) PCT Pub. No.: WO99/48710
PCT Pub. Date: Sep. 30, 1999

(51) Int. Cl.⁷ .............. B60C 9/18; B60C 9/20; B60C 9/22; B60C 17/00
(52) U.S. Cl. .......... 152/517; 152/531; 152/532
(58) Field of Search .................. 152/531–533, 152/517

(56) References Cited

U.S. PATENT DOCUMENTS

| | | |
|---|---|---|
| 4,111,249 A | 9/1978 | Markow |
| 4,262,726 A | 4/1981 | Welter |
| 5,042,546 A | 8/1991 | Forney et al. |
| 5,368,082 A | 11/1994 | Oare et al. |

FOREIGN PATENT DOCUMENTS

| | | |
|---|---|---|
| EP | 0605177 | 7/1994 |
| EP | 0778164 A1 | 6/1997 |
| EP | 0844110 A2 | 5/1998 |
| FR | 2425334 | 7/1979 |
| FR | 2460218 | 1/1981 |
| WO | WO88/08373 | 11/1988 |

*Primary Examiner*—Adrienne C. Johnstone
(74) *Attorney, Agent, or Firm*—Howard M. Cohn

(57) ABSTRACT

A pneumatic radial ply tire (50) having a tread (52), a carcass (60) with two sidewalls (77, 78), one or more radial plies (70, 72), two annular beads (36a', 36b'), a belt structure (56) located radially between the tread and the radial ply structure (58), a fabric underlay (54), deployed radially inward of the belt structure, and a tread insert (66) deployed between the belt structure and the fabric underlay. Said underlay (66) contains circumferentially aligned high-modulus fibers or cords (88) which, in combination with metal belt structure (56) and the tread insert (66), contribute to circumferential tread rigidity. Insert (66), in conjunction with the belt structure (56) and the radial ply structure (58), contributes to lateral tread rigidity. The circumferential and lateral stiffening of the tread (52) enhances high-speed runflat handling and contributes to improved runflat operational life.

7 Claims, 5 Drawing Sheets

RUNFLAT TIRE WITH FABRIC UNDERLAY AND TREAD INSERT

TECHNICAL FIELD

The present invention relates to a pneumatic radial ply runflat tire whose runflat handling is improved by providing a means for stiffening the tread and its underlying support structure. The increased rigidity improves the tire's runflat capability by resisting the tendency of the center of the tread to buckle upward during operation under conditions of unpressurized or underpressurized operation. During high-speed operation, the increased rigidity resists upward buckling of the center part of the tread and its underlying structure thereby enhancing the tread's ground contact and lateral grip.

BACKGROUND OF THE INVENTION

Various methods have been devised for enabling the safe, continued operation of unpressurized or underpressurized vehicle tires with the intent of minimizing further damage to the uninflated tire and without simultaneously compromising vehicle handling over a distance from the place where the tire lost its pressure to a place desired by the driver, such as a service station where the tire can be changed. Loss of tire pressure can result from a variety of causes, including puncture by a foreign object such as a nail or other sharp object piercing the pneumatic tire installed on a vehicle.

Pneumatic tires designed for sustained operation under conditions of unpressurization or underpressurization are also called runflat tires, as they are capable of being driven in the uninflated or "flat" condition. The conventional pneumatic tire, when operated without inflation, collapses upon itself, its sidewalls buckling outward in the region where the tread contacts the ground, when supporting a vehicle load. In general, the term "runflat" means that the tire structure alone has sufficient rigidity and strength to support the vehicle load when the tire is operated in the uninflated condition such that the sidewall and internal surfaces of the tire do not collapse or buckle onto themselves, i.e., without recourse to incorporation of other internal supporting structures and devices to prevent the tire from collapsing.

An example of a runflat tire design is described in U.S. Pat. No. 4,111,249, entitled the "Banded Tire," in which a hoop or annular band approximately as wide as the tread is circumferentially deployed beneath the tread. The hoop in combination with the rest of the tire structure could support the vehicle weight in the uninflated condition. This prior art banded tire is disclosed as being able to actually induce tension the ply cords even in the uninflated condition.

Numerous methods have been used to achieve workable runflat tire designs. Generally, such tires incorporate sidewall designs that are thicker and/or stiffer, so that the tire's load can be carried by an uninflated tire with minimum adverse effects upon the tire itself and upon vehicle handling until such reasonable time as the tire can be repaired or replaced. The methods used in sidewall stiffening include the incorporation of circumferentially disposed inserts in the inner peripheral surface of the sidewall portion of the carcass, which is the region in the tire usually having the lowest resistance to deformation under vertical loading. In such runflat tire designs, the thickness of the sidewalls increases and decreases again to form a crescent shaped section between the bead and the tread. The reinforced sidewalls of such tires, when operated in the uninflated condition, experience a net compressive load. The outer portions of the reinforced sidewalls are in tension due to bending deformation which deflects the sidewalls outward or apart from one another in the regions of the sidewall adjacent to the ground-contacting portion of the tread. The inner portions of such reinforced sidewalls, in the region near where the tread contacts the ground, tend to be in compression during runflat operation.

Due to the large amounts of rubber required to stiffen the sidewall members, heat buildup due to flexure of the sidewalls is a major factor in tire failure, especially when the uninflated tire is operated for prolonged periods at high speeds.

A Goodyear patent, U.S. Pat. No. 5,368,082 ('082) disclosed a low aspect runflat pneumatic radial ply tire, which employs special sidewall inserts to improve stiffness. Approximately six additional pounds (2.72 kilograms) of weight per tire was required to support 800 pounds (lb.) [360 kilograms] with this uninflated tire.

This earlier invention, although superior to prior attempts at runflat tire design, still imposed a weight penalty that could be offset by the elimination of a spare tire and the tire jack. However, this weight penalty was even more problematic when the engineers attempted to build high-aspect-ratio tires for large luxury touring sedans. These taller sidewalled tires, having aspect ratios in the 55% to 65% range or greater, means that the sidewall bending stresses are greater than that of the earlier low-aspect-ratio runflat tires disclosed in the '082 patent. Thus the sidewalls of high profile tires had to be stiffened to the point of compromising ride characteristics. Luxury vehicle owners generally do not wish to sacrifice ride quality for runflat capability. The engineering requirements for runflat tire design require that there be no loss in ride or performance. In the very stiff suspension performance type vehicle, such as sport cars and various sport/utility vehicles, the ability to provide such runflat tires is relatively straightforward compared to providing similar runflat tires for luxury sedans which require softer ride characteristics. Light trucks and sport utility vehicles, although not as sensitive to ride performance, provide a runflat tire market that ranges from accepting a stiffer ride to demanding the softer luxury type ride.

French Patent Application 78 13956, Publication No. 2,245,334, discloses a tire having a pair of reinforcing plies 23.2, a lower reinforcing ply 31, an intermediate layer of rubber 30 and a lenticular section 20 contained in each "wall 14". U.S. Pat. No. 4,262,726 discloses a tire having a soft rubber cushion 29 between a carcass overlay 20 and a nearest belt ply 15, to permit unhampered reorientation of the cords of these two components during molding.

In general, runflat tire design is based on the installation of one or more inserts inside each sidewall flex area. The inserts in each sidewall, in combination with the plies, add rigidity to the sidewalls in the absence of air pressure during runflat operation. While the high resistance to compression deflection of the inserts provides the necessary resistance to the collapse of the uninflated loaded tire, this method has several drawbacks which include the above mentioned increase in tire weight and, especially during runflat operation, heat buildup in the insert reinforcements of the sidewalls.

Moreover, during runflat operation, the thick reinforced sidewalls tend to transmit bending stresses to the portion of the tread that contacts the ground. The result is that the central portion of the tread tends to buckle upwards from the ground. The upward buckle reduces the ground contact in the tread's central region, resulting in compromised vehicle handling as well as reduced runflat tread life.

Upward buckling of the tread has adverse effects upon vehicle handling in the runflat mode. Also, the cyclical flexure of the tread during runflat operation tends to cause excessive heating of the tread material, especially during high-speed operation. The excessive heating leads to deterioration of the tire structure in the region of the tread and thereby reduces the runflat tire's operating life in the runflat mode. A hypothetically perfect runflat tire would be able to maintain the central portion of its tread in the same degree of road contact during runflat operation as during fully inflated operation. Then, the high speed handling of the tire would be improved because of the increased lateral grip of the tire.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire having a laterally stiffened tread that resists upward buckling during runflat operation.

Another object of the present invention is to provide a runflat radial tire having a circumferentially stiffened tread that resists upward buckling during runflat operation.

Still another object of the present invention is to provide a runflat radial tire having good high-speed runflat handling characteristics by employing lateral and circumferential stiffening of the tread so as to resist buckling, and consequent loss of ground contact, during runflat operation.

Yet another object of the present invention is to provide a runflat radial tire having good runflat service life as a result of reduced flexure of the tread during runflat operation.

SUMMARY OF THE INVENTION

The present invention relates to a pneumatic radial ply runflat tire having a tread, a casing with two insertreinforced sidewalls, two inextensible annular beads, a radial ply structure, a belt structure located radially between the tread and the radial ply structure, a fabric underlay characterized by being deployed radially inward of the belt structure and radially outward of the radial ply structure, and an elastomer insert characterized by being circumferentially deployed radially inward of the belt structure and radially outward of the fabric underlay and the underlying radial plies. The high-modulus reinforcing cords of the fabric underlay are circumferentially aligned, and they are capable of supporting tensile loads. The elastomeric insert, located beneath the belt structure, extends across about 40 percent to about 100 percent and preferably about 50 percent to about 90 percent of the width of the belt structure and is centered upon the tire's equatorial plane. The insert acts to separate the belt structure from the fabric underlay and the radial ply structures, thereby giving mechanical advantage to the compression-load-bearing belt structure which, in concert with the fabric underlay, contributes to the tread's circumferential rigidity, the insert, also acting in concert with the radial ply structure, contributes to the tread's lateral rigidity. At least one of the radial plies might be reinforced with inextensible metal cords.

In one embodiment of the invention, the pneumatic runflat radial tire has low-aspect-ratio (in the range of about 30% to about 60%) design. Such an embodiment has potential for runflat use in high-performance sports type vehicles or light trucks. This low-aspect-ratio, radial ply, runflat pneumatic tire contains two radial belts, a fabric underlay deployed circumferentially about the tire, radially outward of the ply structure and radially inward of the belt structure, and an elastomeric insert circumferentially deployed radially inward of the belt structure and radially outward of the fabric underlay. The fabric underlay has reinforcing cords that are oriented circumferentially, more or less parallel to the tire's equatorial axis. The combination of the insert and the tensile-stress-bearing fabric underlay contributes to circumferential rigidity of the tread, and the combination of the insert and the radial plies contributes to lateral rigidity of the tread. The enhanced rigidity of the tread resists upward buckling of the central portion of the tread during runflat operation, thereby maintaining good tread-to-road contact and providing improved high-speed runflat vehicle handling. The enhanced rigidity of the tread also reduces the runflat cyclical flexure that can cause heat buildup and consequent tire deterioration.

A second embodiment of this invention relates to a high-aspect-ratio (in the range of about 50% to about 80%) version for a high-profile tire. An example of a use of the high-profile embodiment would be in luxury-type vehicles, high-standing sport-utility vehicles, and some light trucks. During runflat operation of the second embodiment, the enhanced lateral and circumferential rigidity of the tread contributes improved runflat handling and stability as well as a longer runflat service life.

A third embodiment of this invention relates to a radial ply runflat tire having at least one radial ply which is reinforced by essentially inextensible cords, such as steel, and in which the aspect ratio of the tire can be between the maximum and minimum values of aspect ratios for runflat tires (in the range of about 30% to about 80%).

A fourth embodiment of this invention relates to a radial ply runflat tire having a fabric overlay deployed radially outward of the belt structure in conjunction with the fabric underlay of the first embodiment.

BRIEF DESCRIPTION OF THE DRAWINGS

The structure, operation, and advantages of the invention will become further apparent upon consideration of the following description taken in conjunction with the accompanying drawings, wherein:

FIG. 7b shows the orientation with, respect to the tire's equatorial plane, of the one of the reinforcing cords of the fabric underlay shown in FIG. 7a.

DEFINITIONS

Figure 1:
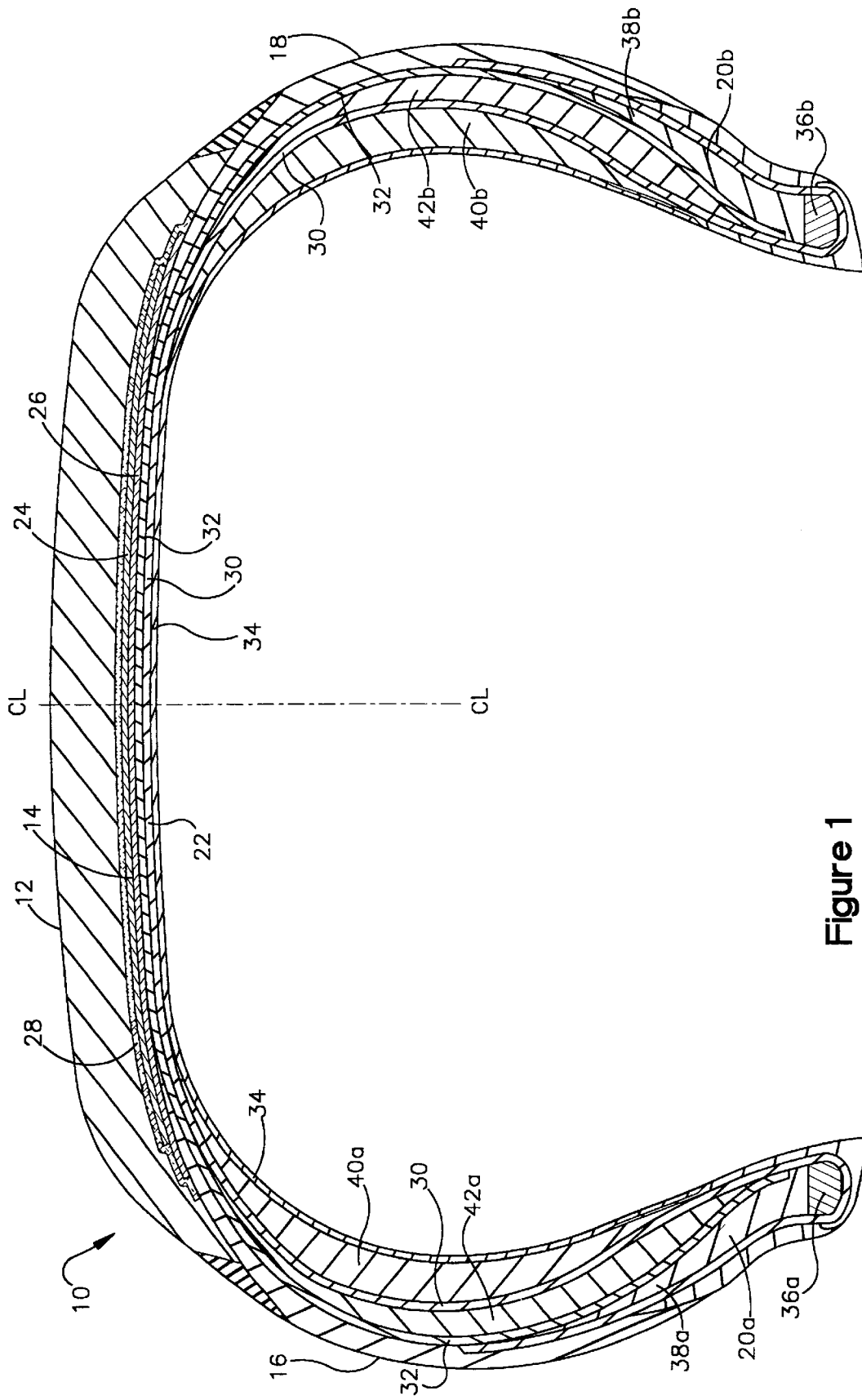
FIG. 1 is a cross-sectional view of a prior art runflat tire design incorporating insert-reinforced sidewalls.

"Apex" means an elastomeric filler located radially above the bead core and between the plies and the turnup plies.

"Aspect ratio" means the ratio of the section height of a tire to its section width.

"Axial" and "axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" means at least two annular layers or plies of parallel cords, woven or unwoven, underlying the tread, unanchored to the bead, and having both left and right cord angles in the range from 18° to 30° relative to the equatorial plane of the tire.

"Breakers" or "tire breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial plane" means the plane perpendicular to the tire's axis of rotation and passing through the center of its tread; or the plane containing the circumferential centerline of the tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Insert" means the crescent- or wedge-shaped reinforcement typically used to reinforce the sidewalls of runflat-type tires; it also refers to the elastomeric, non-crescent-shaped insert that underlies the tread.

"Lateral" means a direction parallel to the axial direction.

"Normal Inflation Pressure" means the specific design inflation pressure at a specified load assigned by the appropriate standards organization for the service condition for the tire.

"Normal Load" means the specific design load at a specified inflation pressure assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90' with respect to the equatorial plane of the tire.

"Radial ply tire" means a belted or circumferentially-restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread contour" means the shape of a tire tread as viewed in axial cross section.

"Tread width" means the arc length of the tread surface in the plane includes the axis of rotation of the tire.

"Wedge insert" means the same as "insert."

DETAILED DESCRIPTION OF THE PREFERRED EMBODIMENT

Prior Art Embodiment

With reference to FIG. 1, a cross section of a typical prior art, low-profile pneumatic radial runflat tire 10 is illustrated. The tire 10 has a tread 12, a belt structure 14, a pair of sidewall portions 16,18, a pair of bead regions 20a and 20b and a carcass structure 22. Belt structure 14 consists of two belts 24,26 and a fabric overlay 28 deployed between the bottom portion of tread 12 and the upper parts of the belt structure. The carcass 22 includes a first ply 30 and second ply 32, a gas-impervious inner liner 34, a pair of beads 36a, 36b, a pair of bead filler apexes 38a, 38b, a first pair of inserts 40a, 40b and a second pair of inserts 42a, 42b. The first or innermost insert 40a, 40b is located between the inner liner 34 and the first ply 30, and the second insert 42a, 42b is located between the first ply 30 and second ply 32. Fabric overlay 28 is disposed beneath, or radially inward of, tread 12 and on top of, or radially outward from, belt structure 14. The reinforced sidewall portions 16,18 of carcass structure 22 give the tire 10 a limited runflat capability.

As can be seen from FIG. 1, the structural reinforcement in the sidewall area of the tire 10 gives a crescent shaped section to the sidewall portions 16,18. This generalized prior art runflat tire design shows the more or less uniformly thickened sidewalls that characterize runflat tire designs. Such insert-reinforced sidewalls are necessary to support the tire's load with minimal sidewall deformation when the tire 10 is in an uninflated state. Such runflat tire designs provide reasonable vehicle handling and performance under conditions of full inflation, and they yield reasonable runflat tire life and vehicle handling when the tire is uninflated. Runflat tires generally weigh more than equivalent non-runflat-capable tires, because of the additional weight of the reinforcement material in the sidewalls; this additional weight is greater in highprofile runflat tires than in low-profile runflat tires.

Figure 2A:
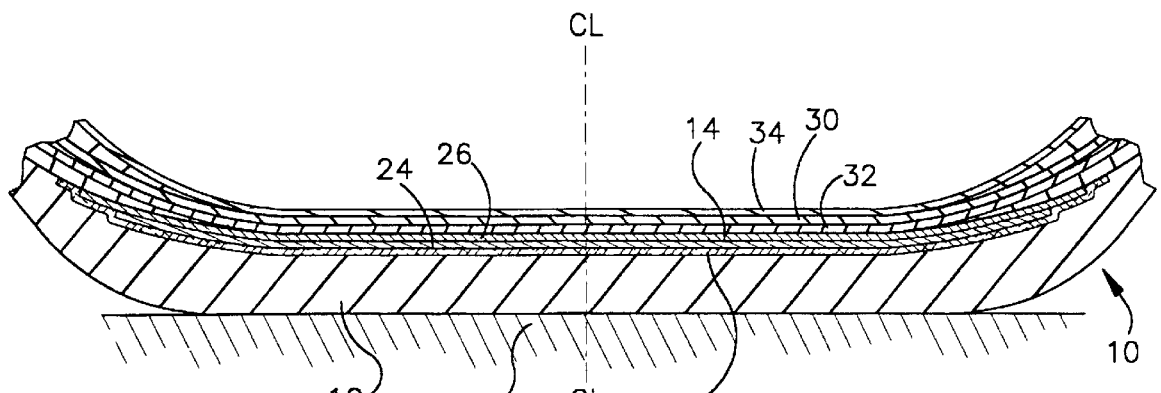
FIG. 2a is a cross-sectional schematic view of a section of the ground-contacting portion of the prior art runflat tire of FIG. 1 in normally inflated condition.

FIG. 2a shows a fragmentary schematic of a normally inflated, prior art runflat tire 10 with its tread 12 in contact with the ground 13. The flattening of the tread 12, in the region where it contacts the ground 13, induces bending stresses in the tread and its underlying components, including belt structure 14, overlay fabric 28, belts 24,26, radial plies 30,32, and inner liner 34. More specifically, the bending stresses derive from the flattening of the tread 12 from the as-molded and as-inflated lateral curvature of tread and its underlying structures. These bending stresses induce tensile stresses in the radially inward structures beneath tread 12, such as the inner liner 34 and the radial plies 30,32.

Corresponding compressive stresses are concurrently induced in the elastomeric material of tread 12 and such underlying structures as the fabric overlay 28 and portions of the belt structure 14.

Figure 2B:
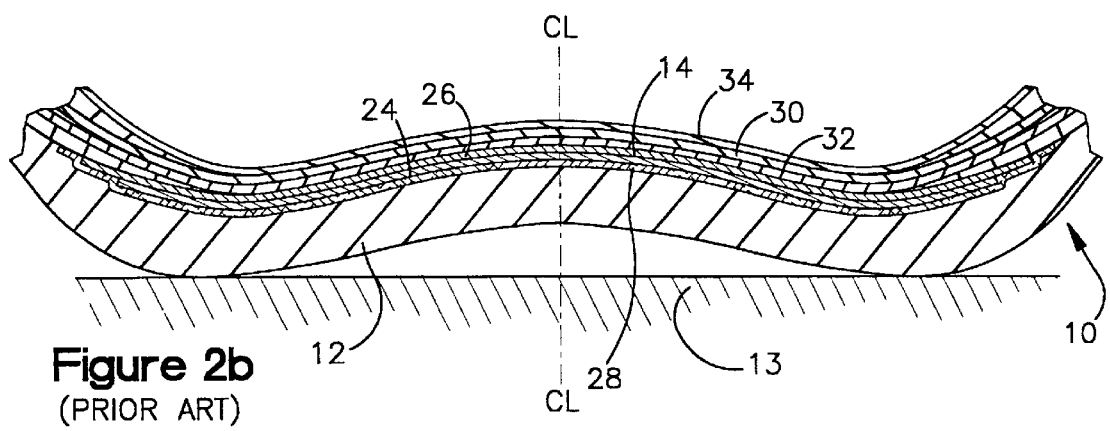
FIG. 2b is a cross-sectional schematic view a section of the ground-contacting portion of the prior art runflat tire of FIG. 1 in an uninflated condition.

FIG. 2b illustrates the upward buckling of tread 12 of the uninflated, prior art runflat tire 10 in the region where the load-bearing tread contacts the flat road surface 13. The upward buckling of the central tread region corresponds to the formation of bending stresses in the central portions of tread 12 and its underlying structures. The bending stresses in the tread 12 during runflat operation, as illustrated in FIG. 2b are greater than those associated with simple flattening of the tread during normal-inflated operation, as illustrated in FIG. 2a.

Figure 3:
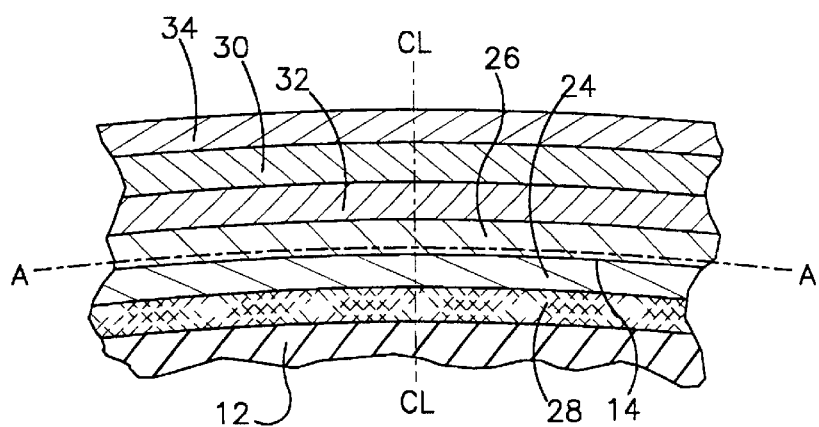
FIG. 3 is an enlarged fragmentary schematic cross-sectional view of the upward-buckled central portion of the uninflated, prior art runflat tire shown in FIG. 2b.

FIG. 3 is a fragmentary schematic detail (not in exact proportion) of the belts 24,26, plies 30,32, inner liner 34 and fabric overlay 28 as they would appear within the upward-buckled central portion of the tread 12 of the prior art tire of FIG. 2b. The neutral bending axis A—A shown in FIG. 3 is shown located in a plausible relationship with respect to the fabric overlay 28, belts 24,26, plies 30,32 and inner liner 34. Those skilled in the art will appreciate that, in FIG. 3, the structural elements of tread 12 which lie above the neutral axis A—A—i.e., radially inward of the tread 12—will experience compressive loading, while those structures located below the neutral axis A—A, i.e. closer to inner liner 34 will experience tensile loading. The location of neutral axis A—A in relation to belts 24,26 is approximate, taking into account the tensile-stress-bearing capabilities of radial plies 30,32 and the compressive-stress-bearing capabilities of the belts 24,26. The fabric overlay 28 is not a compressive-load-bearing structure, nor is the inner liner 34 an effective tensile-load-bearing structure. The neutral axis A—A is shown to be located within belt 24 purely as an approximation of where it would lie given the relative greater modulus of elasticity of the steel cords in belts 24,26 compared to the modulus of the cords that reinforce the plies 30,32. It is recognized that greater or lesser degrees of upward buckling of the central portions of the tread, as illustrated in FIGS. 2b and 3, plausibly will cause the location to the neutral bending axis A—A to change correspondingly with regard to the radial direction.

Figure 4:
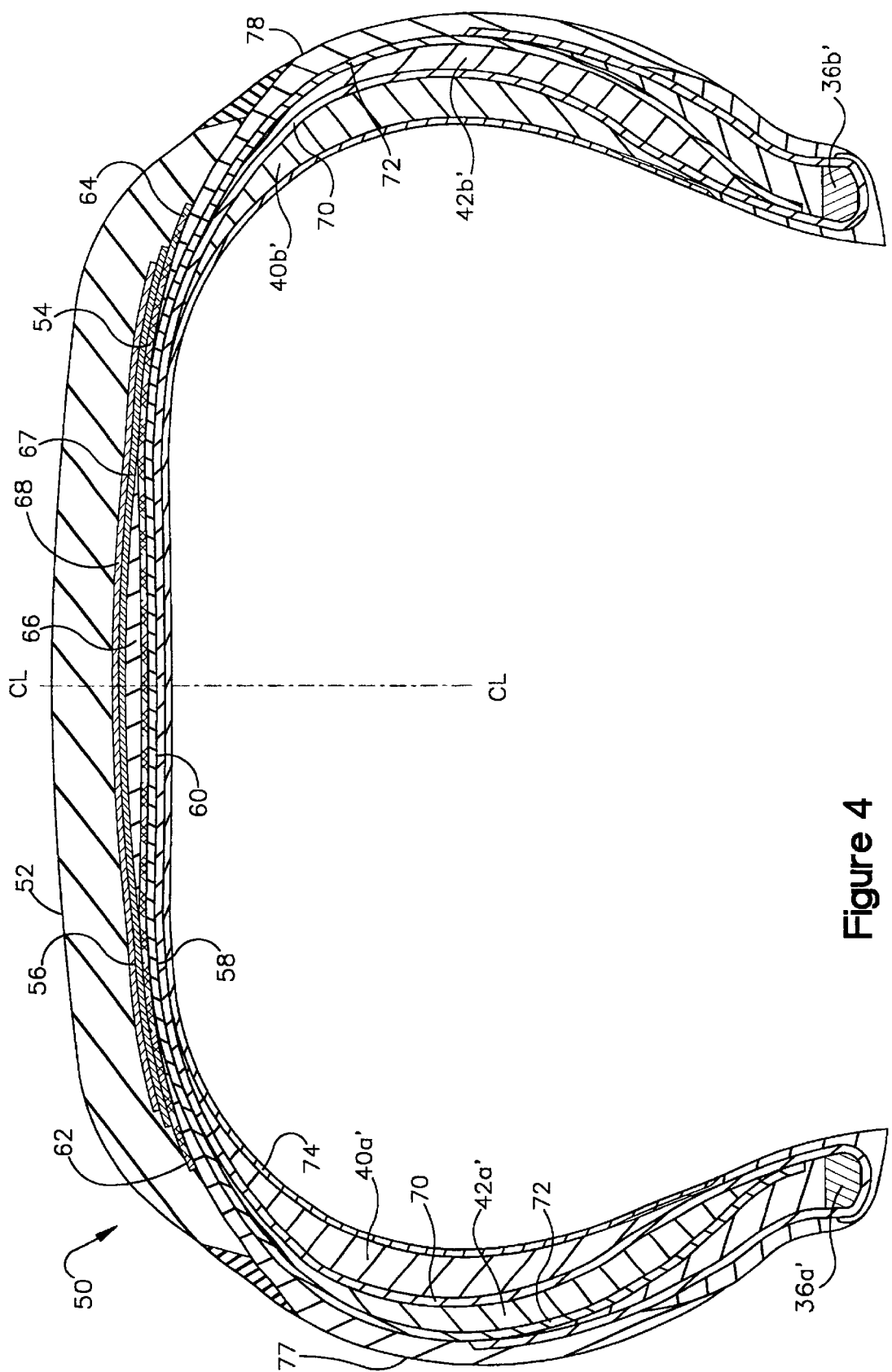
FIG. 4 is a cross-sectional view of a pneumatic, radial ply, runflat tire incorporating the features of the present invention.
Figure 7A:
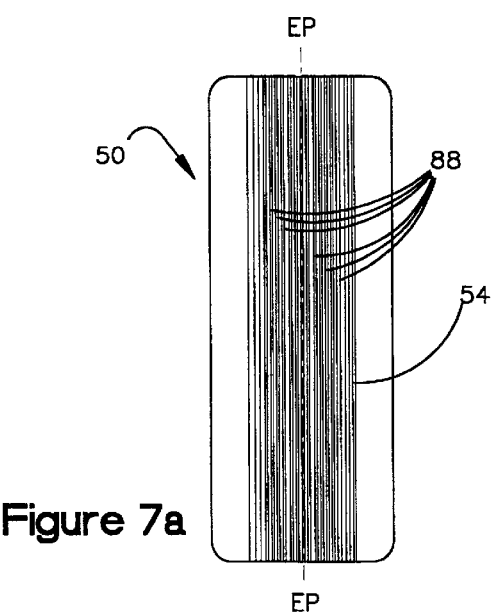
FIG. 7a is a schematic view of the fabric underlay of the present invention and the orientation of its reinforcing cords.
Figure 7B:
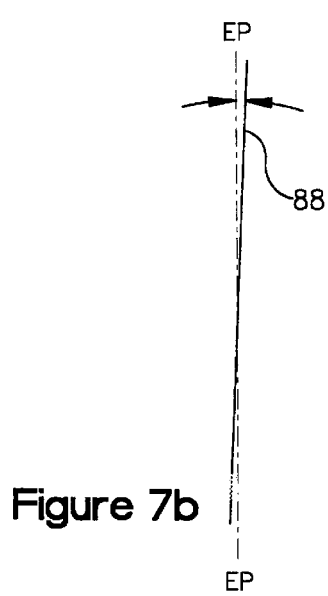

FIG. 4 shows runflat tire 50 according to the present invention. Tire 50 has the same general sidewall construction as that of the prior art runflat tire 10 shown in FIG. 1. One of the inventive features of tire 50 in FIG. 4 is a fabric underlay 54 deployed between the belt structure 56 and the radial ply structure 58 of carcass structure 60. Fabric underlay 54 has lateral margins 62,64, which lie beyond the lateral edges of the belt structure 56. The reinforcing cords of fabric underlay 54, as shown in FIGS. 7a and 7b, are oriented in the range of 0 to about 10 degrees with respect to the tire's equatorial plane, with the preferred orientation being between about 0 and about 5 degrees.

A second inventive feature, as shown in FIG. 4, is a circumferentially deployed wedge insert 66 deployed between the radially inward belt 67 of belt structure 56 and the fabric underlay 54. The insert 66 is lenticular in cross-section. The lateral, or axial, width of insert 66 is from about 50 percent to about 90 percent of the lateral width of tread 52. The maximum thickness of the insert 66 occurs at the central-most portion of the tread, i.e., at the tire's equatorial plane EP, which is shown as centerline CL in FIG. 4. Typically, in a runflat tire of the present invention the thickness of the insert 66 is between about 1 and 8 millimeters and preferably between about 2 and 5 millimeters. Insert 66 is made of a low hysteresis elastomer compound having a hardness of about 60 to about 90, and preferably between about 70 to about 80, and most preferably about 75 on the Shore A scale.

Figure 5:
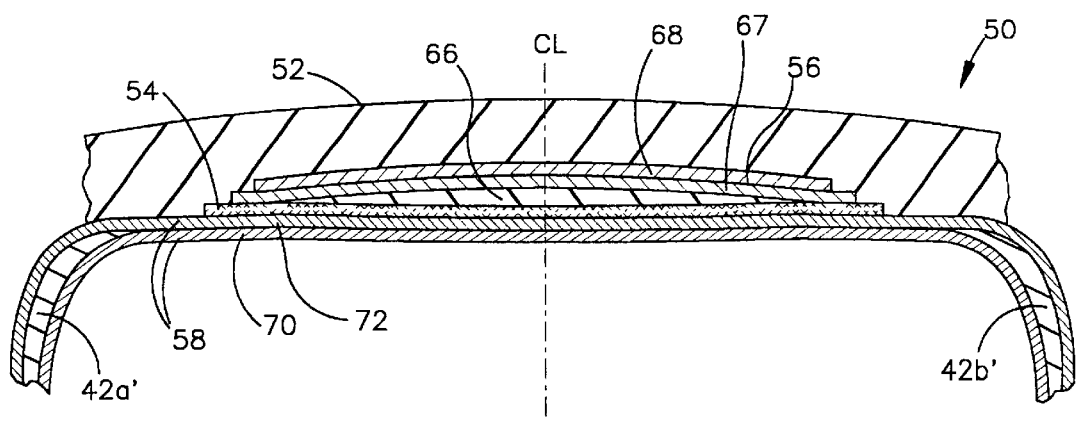
FIG. 5 is a schematic, cross-sectional diagram showing the operative elements of the tread-reinforcing components of the present invention.

FIG. 5 is a fragmentary, schematic cross-sectional view of tire 50 showing the insert 66 in locational relationship to tread 52, the belt structure 56 (comprising inner belt 67 and outer belt 68), fabric underlay 54, radial ply structure 58 (comprising inner ply 70 and outer ply 72) and inserts 42a' and 42b'. Throughout the specification, primed numbers represent structural elements which are substantially identical to structural elements represented by the same unprimed number. The practice of the inventive concept will become evident in the description below.

Tread Insert

Referring to FIGS. 4 and 5, tread insert 66 can be seen to act as a separator between the belt structure 56 and the combination of the fabric underlay 54 and the radial ply structure 58. The separator effect of insert 66 is equivalent to the separator effect of the web portion of a standard structural steel "I" beam consisting of two "flanges" separated by a single "web," as illustrated in FIG. 6.

Figure 6:
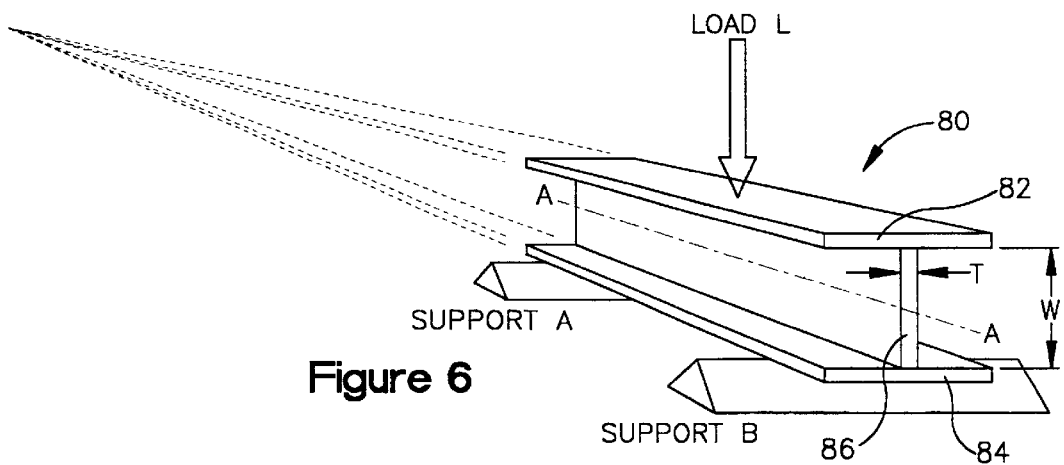
FIG. 6 shows a centrally loaded I-beam, for explaining the operation of the inventive concept of the present invention.

FIG. 6 shows an I-beam segment 80, supported at its ends by supports A and B. I-beam 80 is shown supporting a central load L. In FIG. 6, the load L is such that the upper flange 82 of I-beam 80 is in compression, while the lower flange 84 is in tension. Flanges 82,84 are separated from one another by web 86. Assuming that the dimensions and physical properties of flanges 82,84 are the same, and that the thickness of the web 86 is uniform between the flanges, then the neutral bending axis A—A will be located at the center of the I-beam 80, as shown in FIG. 6. As the width W of web 86 increases, the moment of inertia of beam 80 correspondingly increases with respect to bending under the force of load L. In other words, the rigidity of the I-beam 80, with respect to deformation under the weight of load L, increases in direct relation to the width of web 86, as it separates flanges 82,84. Similarly, in FIGS. 4 and 5, insert 66 operates in a similar fashion to that of web 86 in FIG. 6; i.e., insert 66 separates the belt structure 56 from the ply structure 58, each of which, respectively, is equivalent in respective compressive- and tensile-load bearing capacity to the flanges 82,84 of I-beam 80 in FIG. 6.

Referring now to FIGS. 4 and 5, it should be evident that under runflat conditions, the tendency of the central portions of tread 52, and adjacent underlying structures, to buckle upwards in the region of the centerline CL will induce compression stresses in the steel belt structure 56 and tensile stresses in the radial ply structure 58. Those knowledgeable in the art will understand that the thickness of insert 66 enhances the respective mechanical advantages to the compression-loaded belt structure 56 and tensile-loaded radial ply structure 58 such that the overall system of the belt structure, the ply structure, and insert 66 will have greater resistance to upward buckling of the tread 52 under runflat conditions. In other words, as illustrated in the I-beam example shown in FIG. 6, the compression-bearing flange 82 is equivalent to, or corresponds to, the belt structure 56 in FIGS. 4 and 5, while tension-bearing flange 84 is equivalent, or corresponds to, the radial ply structure 58; also the web 86 in FIG. 6 is equivalent to, or corresponds to, the insert 66. Insert 66 separates the respective compression-loaded belt structure 56 from the tensile-loaded radial ply structure 58, thereby enhancing the lateral rigidity of tread 52 with respect to upward buckling during runflat operation.

Underlay

The fabric underlay 54 shown in FIG. 4 is reinforced with high modulus cords made of materials selected from the group that includes aramid, polyester, rayon and glass. FIG. 7a is an edge-on view of tire 50; the tread and belt structure are not shown in FIG. 7a so that the orientation of the underlying reinforcing cords 88 of the fabric underlay 54 can be illustrated in their approximately circumferential orientation. FIG. 7b is detail view showing the orientation of reinforcing cords 88 in relation to the equatorial plane EP. The range of angles between the cords 88 and the equatorial plane EP is between 0 and about 10 degrees, with between 0 to about 5 degrees being the preferred range of orientation.

The orientation of the high-modulus cords 88 in the fabric underlay 54 is such that, as those skilled in the art will recognize, the reinforcing cords will contribute resistance to tensile-stress-induced circumferential deformation. Furthermore, because fabric underlay 54 is located radially inward of insert 66, i.e., between the insert and the radial ply structure 58, the reinforcing cords 88 of the fabric underlay work in concert with the insert and the belt structure 56 to contribute circumferential rigidity to the tread. In other words, referring to FIG. 6, the compression-bearing flange 82 is equivalent to the belt structure 56 in FIGS. 4 and 5, while tension-bearing flange 84 is equivalent to the fabric underlay 54, and web 86 is equivalent to insert 66 which separates the respective compression-loaded belt structure from the tensile-loaded circumferential cords of the fabric underlay, thereby enhancing the tread's circumferential rigidity with respect to upward buckling during runflat operation.

Operation of the Inventive Concept in Relation to Prior Art

The inventive concept addresses the tread buckling associated with runflat tires when they are operated in the runflat mode.

To reiterate the origins of the tread buckling (which is also known as "tread lift") associated with runflat operation of runflat-type tires, the reinforced sidewalls of a prior art uninflated runflat tire 10 of the type shown in FIG. 1 tend to buckle axially outwards in such a way as to transmit upward-directed bending stresses to the tire's tread 12 and underlying structures such that the central portion of the tread undergoes reduced to zero contact with the road. Upward buckling of the tread can have adverse effects upon vehicle handling in the runflat mode, especially during high-speed operation. In addition, the cyclical flexuring of the tread during runflat operation tends to cause heating of the tread material, especially during high-speed operation, which can cause deterioration of the tire structure in the region of the tread, thereby reducing the runflat tire's operating life in the runflat mode. A hypothetically perfect runflat tire would be able to maintain the central portion of its tread in the same degree of road contact during runflat operation as during fully inflated operation.

In this invention, the incorporation of the wedge insert 66 radially inward of the belt structure 56 and radially outward of the radial ply structure 58 and the fabric underlay 54 increases the tread's rigidity in the lateral direction and in the circumferential direction.

Dynamic Operation of Preferred Embodiment

The operation of wedge insert 66 of the present invention, as shown in cross-sectional view in FIG. 4, is such as to separate the belt structure 56 from the combination of the fabric underlay 54 and the radial ply structure 58. During runflat operation of tire 50, the belt structure 56 experiences compressive loading in response to the tendency of the central portion of tread 52 to lift away from, or buckle upward from, the ground 13, as shown in FIG. 2b. At the same time, the radially oriented reinforcing cords of the radial ply structure 58 experience tensile loading. Insert 66, by separating the compression-load-bearing belt structure 56 from the tension-load-bearing radially oriented cords of radial ply structure 58, acts in a way that is equivalent to that of the web of a structural steel I-beam, thereby contributing to the lateral rigidity of the tread 52 and its underlying structures.

With regard to the operation of wedge insert 66 in relation to the fabric underlay 54, as shown in FIG. 4, the insert separates the belt structure 56 from the fabric underlay 54 with its circumferentially oriented reinforcing cords 88. During runflat operation, the belt structure 56 experiences compressive loading in response to the tendency of the central portion of tread 52 to lift away from the ground. Under the same runflat conditions, the circumferentially oriented reinforcing cords of the fabric underlay 54 experience tensile loading. Insert 66, by separating the compression-load-bearing belt structure 56 from the tension-load-bearing circumferentially oriented cords 88 of the fabric underlay 54, acts in a way that is equivalent to that of the web of a structural steel I-beam, thereby contributing to the circumferential rigidity of the tread 52 and its underlying belts, plies and other structures.

Thus it follows that the compression-load-bearing capacity of the belt structure 56, in combination with the tensile-load-bearing capacity of the radially reinforced ply structure 58 and the circumfenentially reinforced fabric underlay 54, result in a runflat tire design having both lateral and circumferential enhanced resistance to upward buckling of the tread during runflat operation. One immediate benefit of such enhanced tread rigidity is improved tread contact with the road and thereby improved vehicle handling during runflat operation, especially at high speeds. Another benefit is enhanced runflat tire life resulting from a reduction in the amount of cyclical tread flexure, especially during high-speed driving. I.e., severe tread flexure results in heat buildup which can cause deterioration of the tire structure during runflat operation. This invention, by increasing both lateral and circumferential tread rigidity, reduces the amount of tread flexure and subsequent heat build up, thereby giving an improved runflat tire life.

EMBODIMENT ONE

Referring to FIG. 4, there is illustrated a first embodiment of the invention wherein the runflat radial ply tire 50 has a low-aspect-ratio design in the range of about 30 to about 60%. Such an embodiment would have potential for runflat use in high-performance sports type vehicles or light trucks. This low-aspect-ratio runflat radial ply runflat pneumatic tire 50 contains two belts 67,68, a fabric underlay 54, and a tread insert 66. Fabric underlay 54 has reinforcing cords 88 that are oriented circumferentially around the tire, more or less parallel to the tread centerline and perpendicular to the tire's axis of rotation. Tread insert 66 acts as a separator between the respective compressive-load bearing belt structure 56 and the respective lateral tension-bearing cords of the radial ply structure 58 and the circumferential tension-bearing cords 88 of the fabric underlay 54. During runflat operation, the improved lateral and circumferential rigidity of the tread contributes better vehicle handling and stability during high-speed runflat operation. The improved lateral and circumferential rigidity also acts to decrease the flexure which, during runflat operation, can cause heat build up that can accelerate the deterioration of the tire.

EMBODIMENT TWO

A second embodiment of this invention is envisioned in which a high-aspect-ratio version of the runflat radial ply tire 50, shown in FIG. 4, has a high aspect ratio design in the range of about 50 to about 80%. An example of a use of the high-aspect ratio runflat radial ply tire would be in luxury-type vehicles, high-standing sport-utility vehicles, and some light trucks. As with EMBODIMENT ONE, the improved lateral and circumferential rigidity of the tread contributes better runflat tire life and better vehicle handling and stability during high-speed runflat operation.

EMBODIMENT THREE

A third embodiment is envisioned in which this invention is incorporated within a radial ply runflat tire, as also shown in FIG. 4, having at least one radial ply 70 or 72 which is reinforced by essentially inextensible fibers or cords made of metal such as steel, such as disclosed in U.S. Pat. No. 5,871,600, which is incorporated by reference in its entirety herein, and in which the aspect ratio of the tire can be low or high or intermediate between the maximum and minimum values of aspect ratios for runflat tires.

EMBODIMENT FOUR

Figure 8:
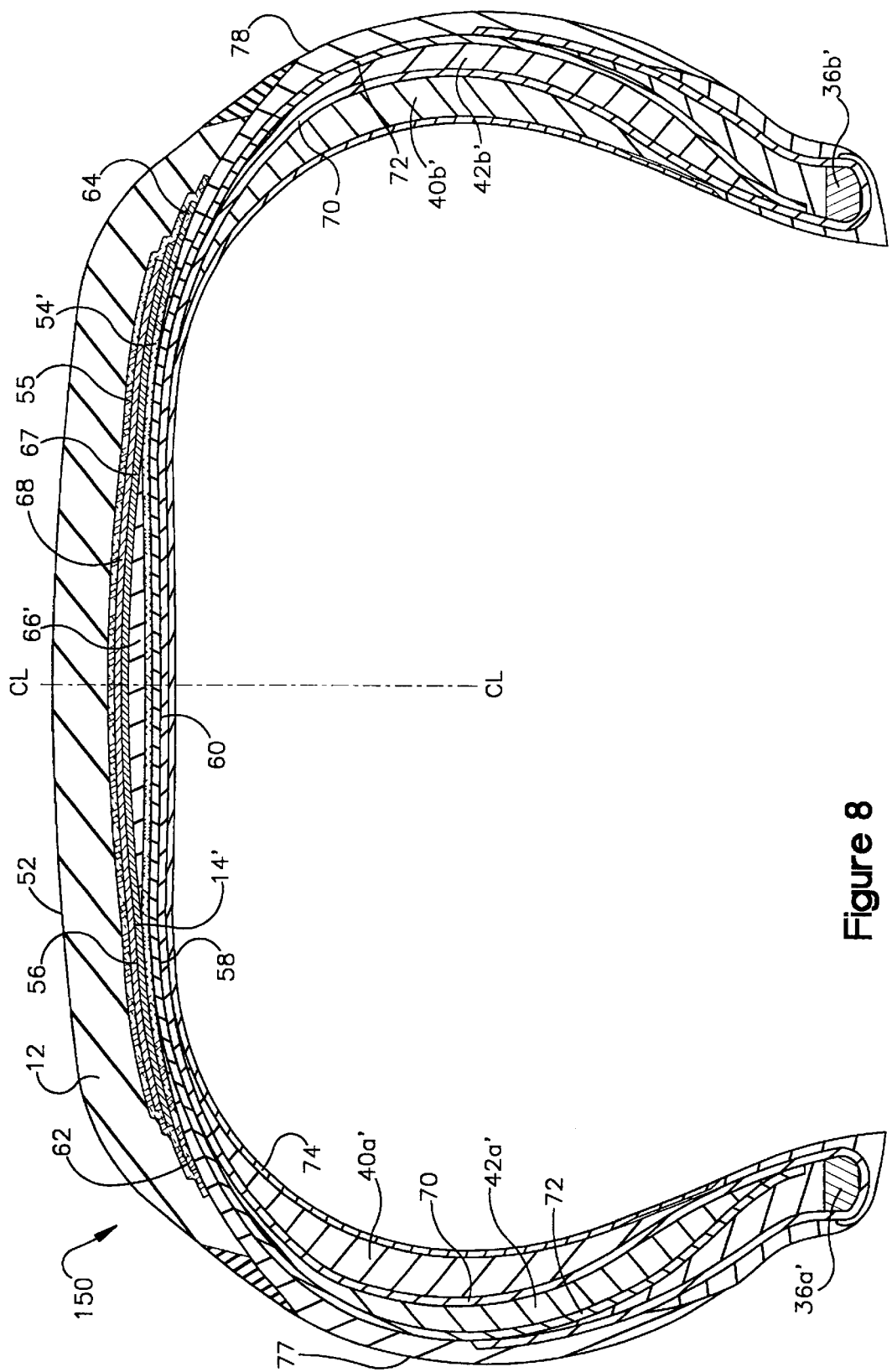
FIG. 8 is a cross-sectional view of a pneumatic, radial runflat tire in accordance with a second embodiment of the present invention which incorporates a fabric underlay in conjunction with a fabric overlay.

A fourth embodiment, as shown in FIG. 8, is envisioned in which this invention is incorporated within a radial ply runflat tire 150 having a fabric overlay 55, similar to fabric overlay 28 of FIG. 1, used in conjunction with fabric underlay 54' and the wedge insert 661. The overlay 55, extends over the ends of the underlay 54' and beneath, or radially inward of, tread 12 and on top of, or radially outward from, belt structure 14'. The other structural elements of tire 150 are substantially identical with those in tire 50 shown in FIG. 4, as discussed before.

Accordingly, the present invention as disclosed herein includes a runflat radial tire having both a laterally and a circumferentially stiffened tread that resists upward buckling during runflat operation as well as provide good high-speed runflat handling because of the resistance to loss of ground contact during runflat operation. In addition the runflat service life is increased as a result of reduced flexure of the tread during runflat operation.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

What is claimed:

1. A pneumatic radial ply runflat tire (50) having a tread (52), a belt structure (56), two beads (36a,36b) two sidewalls (77,78), an inextensible ply structure (58) and an underlay (54) between the belt structure and the ply structure; each sidewall having one or more sidewall inserts (40a,40b,42a, 42b), the runflat tire characterized by:

the underlay (54) being a fabric underlay, disposed between the belt structure and the ply structure, and centered around an equatorial plane (CL) of the tire and having high modulus reinforcing cords oriented 0 degrees to 5 degrees with respect to the equatorial plane; and the tire having an elastomeric lenticular tread insert (66) circumferentially disposed between the fabric underlay and the belt structure, the tread insert having a width of 50 percent to 90 percent of the lateral width of tread and a maximum thickness at the equatorial plane.

2. The tire (50) of claim 1 further characterized by the insert (66) extending about 40% to about 100% of a width of the belt structure (56).

3. The tire (50) of claim 2, further characterized by the insert (66) extending about 50% to about 90% of the width of the belt structure (56).

4. The tire (50) of claim 1 further characterized by the insert (66) centered upon an equatorial plane of the tire.

5. The tire (50) of claim 1 in which each sidewall (77,78) contains a single reinforcing insert.

6. The tire (50) of claim 1 in which one of the radial plies (70, 72) is reinforced with inextensible metal cords.

7. The tire (50) of claim 1 having a fabric overlay (55) between the tread (12) and the belt structure (14'), and extending over the ends of the underlay (54).

* * * * *